United States Patent [19]

Lo et al.

[11] Patent Number: 4,960,842
[45] Date of Patent: Oct. 2, 1990

[54] AMINE CONTAINING INITIATOR SYSTEM FOR ANIONIC POLYMERIZATION

[75] Inventors: Grace Y. Lo; Eric W. Otterbacher, both of Midland, Mich.; Massimo D. Bezoari; Brian W. Walther, both of Baton Rouge, La.

[73] Assignee: The Dow Chemical Company, Midland, Mich.

[21] Appl. No.: 352,670

[22] Filed: May 9, 1989

Related U.S. Application Data

[63] Continuation of Ser. No. 121,364, Nov. 16, 1987, abandoned.

[51] Int. Cl.$^5$ .......................... C08F 2/38; C08F 4/48; B01J 31/12
[52] U.S. Cl. ........................ 526/175; 526/77; 526/180; 526/335; 526/340; 526/340.2; 526/346; 525/250; 525/314; 502/155
[58] Field of Search ................. 526/173, 175, 180; 502/155, 157; 525/250, 314

[56] References Cited

U.S. PATENT DOCUMENTS

| | | | |
|---|---|---|---|
| 3,285,894 | 11/1966 | Lim et al. | 526/175 |
| 3,652,516 | 3/1972 | Farrar | 526/175 X |
| 3,734,973 | 5/1973 | Farrar | 526/175 X |
| 3,763,126 | 10/1973 | Farrar | 526/340 X |
| 3,911,054 | 10/1975 | Roest et al. | 526/180 |
| 4,138,536 | 2/1979 | Hsieh | 526/173 X |
| 4,172,190 | 10/1979 | Tung et al. | 526/173 |
| 4,401,800 | 8/1983 | Hall | 526/175 |
| 4,547,560 | 10/1985 | Hattori et al. | 526/340 |

OTHER PUBLICATIONS

Foss et al., Macromolecules, 10(2), 287 (1977).

*Primary Examiner*—Joseph L. Schofer
*Assistant Examiner*—F. M. Teskin

[57] ABSTRACT

Narrow molecular weight telechelic and/or block copolymers are prepared by anionic polymerization using an initiator composition comprising a multifunctional lithium initiator in combination with an organic diamine or triamine and optionally a metal alkoxide.

17 Claims, No Drawings

AMINE CONTAINING INITIATOR SYSTEM FOR ANIONIC POLYMERIZATION

This is a continuation of application Ser. No. 121,364 filed Nov. 16, 1987, now abandoned.

BACKGROUND OF THE INVENTION

Telechelic and block copolymers are well known in the art and are employed for a variety of purposes. Of the block copolymers, those having the configuration $AB(BA)_n$ wherein n has a value of from about 1-10, particularly 1, that is block copolymers having a simple ABA, configuration are highly important items of commerce for use in adhesives and as elastomers. The A block is preferably an olefin polymer, especially a styrene homopolymer or copolymer. Usually the B block is an elastomeric polymer, especially a polymer of a diene such as a polymer of butadiene or isoprene. To obtain block copolymers of maximum uniformity, it is usually desirable to initiate polymerization employing a multifunctional lithium compound. In the case of an ABA block copolymer (i.e. a triblock copolymer), a difunctional compound would be employed. In the case of an $AB(BA)_3$ block copolymer, a tetrafunctional initiator would be utilized, etc.

Anionic polymerization is well known in the art, for example U.S. Pat. Nos. 4,431,777 and 4,427,837 disclose suitable anionic polymerization processes. Multifunctional initiators are well known and have been previously used in polymerizations. Such initiators and their use are shown in the following U.S. Pat. Nos.: 4,169,115; 4,172,100; 4,172,190; 4,427,837; 4,196,154; and 4,205,016. The teachings of the preceding patents are incorporated herein by reference thereto.

Particularly desirable multifunctional lithium containing compounds are selected from the group consisting of the formula:

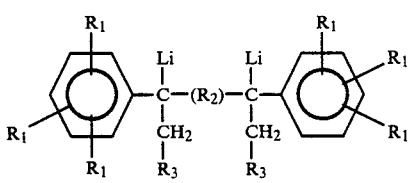

wherein $R_1$ is independently each occurrence hydrogen or an inert radical having from 0 to 16 carbon atoms;

$R_2$ is a divalent organic radical having at least 6 carbon atoms, $R_2$ having at least one aromatic ring and the aromatic ring being directly attached to a carbon which is attached to an aromatic ring of the above formula.

$R_3$ is independently each occurrence selected from the group consisting of alkyl, cycloalkyl, aromatic, mixed alkyl/aromatic, and mixed cycloalkyl/aromatic radicals containing from 1 to 20 carbon atoms. Especially preferred are initiating compounds of the formula:

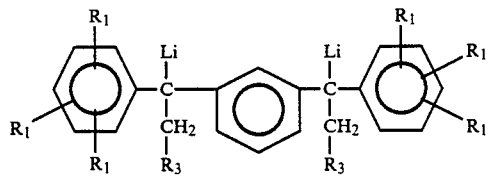

wherein $R_1$ and $R_3$ are as previously defined.

By the term "inert" as used in this context is meant substitutents that do not interfere with the desired anionic polymerization. In a most preferred embodiment, $R_1$ is selected from the group consisting of hydrogen, alkyl, cycloalkyl, alkoxy, aryl and mixtures thereof. Specific examples of difunctional initiators (DFIs) corresponding to the above formula are 1,3-phenylene bis(3-methyl-1-phenylpentylidene)bis-(lithium), 1,3-phenylene bis(3-methyl-1-(4-methylphenyl)-pentylidene) bis(lithium), 1,3-phenylene bis(3-methyl-1-(4-ethylphenyl)-pentylidene) bis(lithium), 1,3- phenylene bis(3-methyl-1-(4-(1,1-dimethylethyl)phenyl)pentylidene) bis(lithium), and 1,4-phenylene bis(3-methyl-1-(4-dodecylphenyl)-pentylidene) bis(lithium).

Generally, the above described multifunctional lithium containing initiators result in the preparation of polymerization products having a broader molecular weight range than is often desired. In certain applications, particularly adhesives, this may result in inferior product properties. As a particular example we have now found that styrene-isoprene-styrene triblock polymers of narrower molecular weight distribution tend to produce adhesive formulations having improved shear hold strength and the triblock polymer itself normally possesses improved tensile rupture strength compared to broader molecular weight versions thereof. Accordingly, for adhesive applications it would be desirable to prepare block copolymers having a relatively narrow molecular weight distribution, especially distributions wherein the ratio of weight average molecular weight (Mw) to number average molecular weight (Mn) is less than or equal to 1.2 and preferably less than 1.1.

A technique that may be employed to produce narrow molecular weight distribution polymers is the addition of certain polar compounds to the reaction mixture. Disadvantageously, however, in the polymerization of isoprene containing mixtures, the resulting polymer product possesses a high percentage of undesired vinyl functionality producing 1,2- or 3,4-addition polymer products. Such addition products are collectively referred to hereinafter as polymers having 3,4- addition microstructure. Polymers having this microstructure likewise generally possess inferior elastomer properties. Consequently, there remains a need in the art to provide a technique for the anionic polymerization of monomers to yield narrow molecular weight distribution polymers, especially block copolymers, having physical properties and molecular structure that are not otherwise disadvantageously affected.

It would be desirable if there were available an improved process for the preparation of block copolymers of the $AB(BA)_n$ variety.

It would also be desirable if there were available an improved process for the preparation of block copolymers of the $AB(BA)_n$ variety which would result in products having a narrow molecular weight distribution.

It would also be desirable if there were available an initiator system which would provide such polymers having a narrow molecular weight distribution.

SUMMARY OF THE INVENTION

According to the present invention, there is now provided a process for the solution polymerization of at least one anionically-polymerizable monomer wherein polymerization of the monomer is initiated in the presence of a multifunctional lithium-containing initiator system comprising a multifunctional lithium compound and an organic diamine or triamine corresponding to the formula:

$$R''_2N-R'(-N-R')_n-NR''_2 \quad (I)$$
$$\phantom{R''_2N-R'(-N-}R''$$

wherein:
R' independently each occurrence is a $C_{2-20}$ alkadiyl group or an inertly substituted derivative thereof;
R'' independently each occurrence is a $C_{1-20}$ alkyl group or an inertly substituted derivative thereof; and
n is zero or one.

The organic diamine or triamine is preferably employed in an amount that is effective to reduce the molecular weight distribution of the resulting polymer.

Also contemplated in the scope of the present invention is a polymerization initiator system comprising a hydrocarbon solvent, a multifunctional lithium-containing polymerization initiator and an amount of an organic diamine or triamine of the above formula sufficient to result in a narrowing of the molecular weight distribution of a polymer polymerized thereby.

Desirably, the process and initiator system of the present invention result in the formation of diene polymers having a relatively small percentage of 3,4-addition microstructure. As such the polymer microstructure is not significantly altered from that obtained by the use of DFI alone. In addition diene polymers formed according to the process of the present invention normally demonstrate improved properties such as tensile rupture strength.

In a further embodiment, the present invention contemplates the additional presence of a metal alkoxide, especially an alkali metal alkoxide, most particularly a $C_{2-16}$ lithium alkoxide. Such a metal alkoxide is present in the system in an amount effective to reduce the molecular weight distribution of the resulting polymer. Use of the metal alkoxide in addition to the organic diamine or triamine may allow for a reduction in the amounts of diamine or triamine used according to the invention. Advantageously, the use of an organic diamine or triamine with the additional presence of the metal alkoxide also does not adversely affect the microstructure of the resulting polymer.

Detailed Description of the Invention

Diene monomers suitable for use in the practice of the present invention include conjugated dienes, preferably 1,3-butadiene, isoprene and mixtures thereof.

In addition to diene monomers, one or more olefin comonomers are additionally suitably employed. Any copolymerizable olefin comonomer may be employed. Preferred olefin comonomers are alkenyl aromatic monomers. By the term alkenyl aromatic monomer is meant a monomer of the formula:

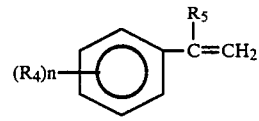

where n is an integer from 0 to 3, $R_4$ is an alkyl radical containing up to 5 carbon atoms and $R_5$ is hydrogen or methyl. Preferred alkenyl aromatic monomers are styrene, vinyl toluene (all isomers, alone or in admixture), α-methylstyrene, and mixtures thereof. Particularly preferred alkenyl aromatic monomers are styrene and mixtures of styrene and α-methylstyrene.

Solvents useful for the practice of the present invention are inert hydrocarbons or mixtures of hydrocarbons, including an excess of one or more of the monomers employed in the polymerization. For example, excess α-methylstyrene may be employed in the preparation of block copolymers containing a styrene/α-methylstyrene copolymer as the olefin polymer block.

In addition, a relatively polar additive such as tetrahydrofuran, may also be utilized in combination with the initiator system of the invention in order to achieve varied microstructure in the resulting diene block, if desired. However, as previously explained, the invention has the inherent beneficial feature of preparing relatively minor quantities of 3,4-addition microstructure polymers in the absence of such a polar additive. Preferred solvents are pentane, isopentane, cyclopentane, hexane, cyclohexane, toluene, and mixtures thereof.

By the term inert substituent as employed in the previously identified amine formula is meant a substituent which does not alter the ability of the diamine or triamine to function as stated according to the present invention. Examples include an alkyl, cycloalkyl, or aryl substituent.

Preferred diamines or triamines are those corresponding to the above described formula wherein:
R' each occurrence is 1,2-ethanediyl or 1,3-propanediyl; and
R'' is independently each occurrence selected from the group consisting of $C_{1-4}$ alkyl groups.

As previously mentioned, in a further embodiment of the present invention, a metal alkoxide may be employed in combination with the previously described diamines or triamines and multifunctional lithium compound. Preferred alkoxides are $C_{2-16}$ lithium alkoxides. Suitable metal alkoxides are readily prepared by the reaction of a metal alkyl compound with the corresponding aliphatic alcohol or by direct reaction of the metal and alcohol. Such alcohols may be monohydric or polyhydric and include ethanol, isopropanol, ethylene glycol and the like.

When employed, the metal alkoxide is preferably added before or simultaneously with the multifunctional lithium intitiator and may be added before, after or simultaneous with the addition of the diamine or triamine. The presence of an alkoxide may permit a reduction in the amount of diamine or triamine employed without sacrifice of polymer properties. The use of both a diamine or triamine and an alkoxide is particularly desirable at higher reaction temperatures. Surprisingly, it has been discovered that the viscosity of a reaction mixture containing both the diamine or triamine and the metal alkoxide is substantially less than the viscosity of a corresponding reaction mixture lacking a metal alkoxide. This achievement advantageously permits an increase in polymer solids to be attainable and may allow for the preparation of polymers having improved properties such as shear hold, etc.

Preferably, the ratio of diamine or triamine to multifunctional lithium compound (based on moles of diamine or triamine per equivalent of multifunctional lithium compound) is from about 0.005:1 to 1:1 and most preferably from about 0.02:1 to 0.5:1. Similarly, the metal alkoxide is preferably employed in a ratio from about 0.0:1 to about 5:1, based on moles of metal alkoxide per equivalent of multifunctional lithium compound.

The polymerization may be conducted at a wide range of temperatures. Preferred temperatures are from about 0° C. to about 160° C., most preferably from about 20° C. to about 120° C.

The invention is further illustrated but not limited by the following examples.

Specific Embodiments

All reactions and polymerizations were conducted under a dry nitrogen atmosphere. All glass containers were baked at 150° C. overnight and flushed with nitrogen before use. The transfer of monomers and reagents was carried out with nitrogen flushed syringes. Solvents were purified by passage through a column of activated Fisher Absorption alumina. Styrene was purified by passage through alumina followed by vacuum distillation from calcium hydride. Isoprene was purified by passage through alumina followed by vacuum distillation from dibutylmagnesium. In examples utilizing an amine, the amount of amine used (denoted by the ratio: AMINE/LIVING ENDS) is reported as the ratio of the number of moles of amine to the number of moles of polymer living ends, assuming that each difunctional initiator results in the generation of two polymer living ends.

Tensile properties of polymers were tested at 23° C. on specimens compression molded at 200° C. For each sample, about 6 grams of polymer was molded into a 0.025 inch thick square sheet each side of which had a length of about 3.5 inches (9 cm). Four 0.025 inch thick, 3 inch long, dumbbell shaped specimens were then cut from each sheet for testing. The crosshead speed for the tensile tests was 20 inches per minute. The data reported for each sample was an average of four measurements.

Preparation of Difunctional Initiator (DFI)

The difunctional initiator (DFI) solution was prepared by adding 54 ml of a cyclohexane solution containing 76.57 mmole of sec-butyllithium to a 500 ml stainless steel tube which contained 38.32 mmole of 1,3-bis(1-phenylethenyl)benzene in 426 ml of toluene under nitrogen. The resulting solution contained 0.074 mmole of active DFI, 1,3-phenylene-bis(3-methyl-1-phenylpentylidene) bis(lithium), per ml of solution. The tube was stored at room temperature and the initiator was used for many polymerization runs. Before each use, a small amount of DFI solution in excess of that required for the polymerization was transferred into a nitrogen filled flask. The exact amount was then transferred by syringe from the flask either directly to the reactor or to another flask to be pre-mixed with an amine coinitiator and then transferred to the reactor.

EXAMPLE 1

Preparation of Styrene-Isoprene-Styrene Triblock Polymers (SIS)

The DFI solution (11.9 ml containing 0.88 mmole of DFI) was added to a nitrogen filled flask which contained 0.31 mmole of pentamethyldiethylenetriamine (PMDETA) in 1.3 ml of toluene. The solution was stirred at room temperature for about 20 minutes before use. The ratio AMINE/LIVING ENDS was 0.18. A one liter jacketed reactor with a hollow auger agitator was used as the polymerization vessel. An excess of purified cyclohexane was added to the reactor and deaired. Excess solvent was discharged retaining 675 ml in the reactor. 125 ml of distilled isoprene was then added by syringe. After mixing well, a 50 ml aliquot of the feed was withdrawn by a syringe and transferred into a nitrogen filled flask which contained a magnetic stirrer for purposes of determining the amount of impurities in the mixture. The original DFI solution which contained no amine was added dropwise to the aliquot until a light orange color was apparent. From this external titration result, the amount of DFI required to react with the impurities in the feed in the reactor (blanking) was calculated to be 0.02 mmole. Accordingly, this amount of DFI was added to the reactor. The jacket was set at 55° C. When the solution temperature reached about 50° C., 10.5 ml of the above prepared amine-DFI solution (containing 0.70 mmole DFI) was added. A nitrogen pressure of 6-10 psi was maintained in the head space of the reactor during the entire polymerization. About 50 minutes after the addition of the initiator solution, 15 ml of styrene was added. About 40 minutes after adding styrene, 2 ml of 2-propanol was added as the terminator. The resulting polymer syrup was contacted with $CO_2$, 2,6-ditertiarybutyl-4-methylphenol antioxidant (0.9 g) was added, and the polymer was recovered by vacuum devolatilization at 180° C. for about 1 hour.

As analyzed by proton nuclear magnetic resonance spectroscopy (nmr), the SIS triblock elastomer contained 85.0 wt. % isoprene and 15.0 wt. % styrene. The microstructure of the polyisoprene centerblock was 10.0% 3,4-addition and 90.0% 1,4-addition. The weight average molecular weight, Mw, was 148,000 and the molecular weight distribution, Mw/Mn was 1.07 as determined by gel permeation chromatography (GPC). Properties of molded samples included a tensile strength at rupture of 2510 psi (17,300 KPa) and an ultimate elongation of 1280%.

COMPARATIVE EXAMPLE 1

The procedure of Example 1 was substantially repeated with the exception that the initiator consisted solely of 0.79 mmole of DFI. The resultant SIS triblock polymer had the following composition and properties.

| Composition: | |
|---|---|
| Isoprene | 84.6 wt % |
| Styrene | 15.4 wt % |
| 3,4-addition microstructure | 7.5 wt % |
| Molecular weight: | |
| Mw | 229,000 |
| Mw/Mn | 1.44 (bimodal distribution) |
| Properties: | |
| Tensile rupture strength | 880 psi (6,070 KPa) |

| -continued | |
|---|---|
| Ultimate elongation | 1470% |

EXAMPLE 2

The procedure of Example 1 was substantially repeated with the exception that the styrene monomer was added before the initiation of isoprene polymerization in order to prepare a tapered or graded triblock copolymer. The following quantities of materials were used:

| Feed: | |
|---|---|
| Cyclohexane | 750 ml |
| Isoprene | 100 ml |
| Styrene | 45 ml |
| 40 ml of the above feed solution were withdrawn for external titration to determine the quantity of initiator consumed by impurities. | |
| Initiator: | |
| PMDETA | 0.33 mmole |
| DFI | 0.99 mmole |
| (AMINE/LIVING ENDS = 0.17) | |

The resulting polymer was a tapered SIS triblock elastomer having the following composition and properties.

| Composition: | |
|---|---|
| Isoprene | 62.3 wt % |
| Styrene | 37.7 wt % |
| 3,4-addition microstructure | 11.5 wt % |
| Molecular weight: | |
| Mw | 113,000 |
| Mw/Mn | 1.06 |
| Properties: | |
| Tensile rupture strength | 2100 psi (14,500 KPa) |
| Ultimate elongation | 1240% |

Comparative Example 2

The procedure of Example 2 was substantially repeated with the exception that the initiator used was 1.03 mmole of the DFI with the absence of an amine coinitiator. The resulting polymer was a tapered SIS triblock polymer having the following compositions and properties.

| Composition: | |
|---|---|
| Isoprene | 63.3 wt % |
| Styrene | 36.7 wt % |
| 3,4-addition microstructure | 8.8 wt % |
| Molecular weight: | |
| Mw | 131,000 |
| Mw/Mn | 1.33 (bimodal distribution) |
| Properties: | |
| Tensile rupture strength | 540 psi (3,720 KPa) |
| Ultimate elongation | 810% |

EXAMPLE 3

The procedure of Example 1 was substantially repeated excepting that pentamethyldiethylenetriamine (PMDETA) solution was separately added to the reactor just prior to addition of the DFI. The following quantities of materials were used:

| Cyclohexane | 650 ml |
|---|---|
| Isoprene | 120 ml |
| PMDETA | 0.17 mmole |
| DFI | 0.74 mmole |
| (AMINE/LIVING ENDS = 0.11) | |
| Styrene | 16 ml |

The resulting triblock polymer had the following composition and properties.

| Composition: | |
|---|---|
| Isoprene | 84.6 wt % |
| Styrene | 15.4 wt % |
| 3,4-addition microstructure | 8.3 wt % |
| Molecular weight: | |
| Mw | 147,000 |
| Mw/Mn | 1.09 |
| Properties: | |
| Tensile rupture strength | 1870 psi (12,900 KPa) |
| Ultimate elongation | 1490% |

EXAMPLES 4 TO 7

The procedure of Example 1 was repeated to prepare four more SIS triblock polymers with the following exceptions. In Example 4, AMINE/LIVING ENDS was 0.04. In Examples 5, 6 and 7, different triamines were used. The results are provided in Table I.

TABLE I

Results of Examples 4 to 7

| Ex. No. | Amine | Amine/ Living Ends | Composition 3,4-addition micro-structure wt % | Isoprene content wt % | Mw × 10⁻³ | Mw/Mn | Tensile Strength psi | Tensile Strength KPa | Ultimate Elongation % |
|---|---|---|---|---|---|---|---|---|---|
| 4 | A | 0.04 | 8.2 | 84.7 | 162 | 1.20 | 1420 | 9790 | 1370 |
| 5 | B | 0.19 | 9.6 | 84.9 | 145 | 1.12 | 2680 | 18500 | 1440 |
| 6 | C | 0.25 | 11.6 | 84.9 | 143 | 1.07 | 2580 | 17800 | 1370 |
| 7 | C | 0.12 | 9.9 | 85.3 | 137 | 1.07 | 2140 | 14800 | 1490 |

| Amine | Name | Structure |
|---|---|---|
| A | N,N,N',N'',N''-Pentamethyl-diethylenetriamine | 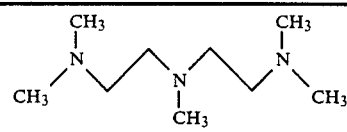 |

TABLE I-continued
Results of Examples 4 to 7

| | | |
|---|---|---|
| B | N,N,N',N'',N''-Pentamethyl-di-1,3-propylenetriamine | CH₃-N(CH₃)-CH₂CH₂CH₂-N(CH₃)-CH₂CH₂CH₂-N(CH₃)-CH₃ |
| C | 4-Ethyl-1,1,7,7-tetramethyl-diethylenetriamine | (CH₃)₂N-CH₂CH₂-N(CH₂CH₃)-CH₂CH₂-N(CH₃)₂ |

EXAMPLE 8

The procedure of Example 1 was substantially repeated with the exception that the DFI was 1,3-phenylene bis(3-methyl-1-(4-methylphenyl)pentylidene) bis(lithium). The resultant SIS triblock elastomer had the following composition and properties:

| Composition: | |
|---|---|
| Isoprene | 85.1 wt % |
| Styrene | 14.9 wt % |
| 3,4-addition microstructure | 10.4 wt % |
| Molecular Weight: | |
| Mw | 142,000 |
| Mw/Mn | 1.07 |
| Properties: | |
| Tensile rupture strength | 3010 psi |
| | (20,800 KPa) |
| Ultimate elongation | 1380% |

EXAMPLE 9

The procedure of Example 8 was substantially repeated with the exception that a diamine, N,N,N',N'-tetramethylethylenediamine was employed. The ratio AMINE/LIVING ENDS was 0.31. The resultant SIS triblock elastomer had the following composition and properties:

| Composition: | |
|---|---|
| Isoprene | 85.3 wt % |
| Styrene | 14.7 wt % |
| 3,4-addition microstructure | 10.9 wt % |
| Molecular Weight: | |
| Mw | 167,000 |
| Mw/Mn | 1.10 |
| Properties: | |
| Tensile rupture strength | 1940 psi |
| | (13,400 KPa) |
| Ultimate elongation | 1240% |

EXAMPLE 10

The procedure of Example 1 was substantially repeated excepting that the ratio of AMINE/LIVING ENDS was 0.24. The resultant SIS triblock elastomer had the following composition and properties:

| Composition: | |
|---|---|
| Isoprene | 84.7 wt % |
| Styrene | 15.3 wt % |
| 3,4-addition microstructure | 10.1 wt % |
| Molecular Weight: | |
| Mw | 189,000 |
| Mw/Mn | 1.12 |

| -continued | |
|---|---|
| Properties: | |
| Tensile rupture strength | 2650 psi |
| | (18,300 KPa) |
| Ultimate elongation | 1315% |

EXAMPLE 11

The procedure of Example 1 was substantially repeated with the exception that the DFI was 1,3-phenylene bis(3-methyl-1-(4-ethylphenyl)pentylidene) bis(lithium). The resultant SIS triblock elastomer had the following composition and properties:

| Composition: | |
|---|---|
| Isoprene | 85.0 wt % |
| Styrene | 15.0 wt % |
| 3,4-addition microstructure | 9.4 wt % |
| Molecular Weight: | |
| Mw | 179,000 |
| Mw/Mn | 1.08 |
| Properties: | |
| Tensile rupture strength | 2390 psi |
| | (16,500 KPa) |
| Ultimate elongation | 1470% |

EXAMPLE 12

The procedure of example 1 was substantially repeated excepting that the DFI was 1,4-phenylene bis(3-methyl-1-(4-dodecylphenyl)pentylidene)-bis(lithium). The resulting SIS triblock elastomer had the following composition and properties:

| Composition: | |
|---|---|
| Isoprene | 85.2 wt % |
| Styrene | 14.8 wt % |
| 3,4-addition microstructure | 10.5 wt % |
| Molecular Weight: | |
| Mw | 162,000 |
| Mw/Mn | 1.08 |
| Properties: | |
| Tensile rupture strength | 2940 psi |
| | (20,300 KPa) |
| Ultimate elongation | 1350% |

EXAMPLE 13

The procedure of example 1 was substantially repeated excepting that the DFI was 1,3-phenylene bis(3-methyl-1-(4-(1,1-dimethylethyl)phenyl)-pentylidene) bis(lithium). The resulting SIS triblock elastomer had the following composition and properties:

| Composition: | |
|---|---|
| Isoprene | 85.2 wt % |
| Styrene | 14.8 wt % |
| 3,4-addition microstructure | 10.5 wt % |
| Molecular Weight: | |
| Mw | 154,000 |
| Mw/Mn | 1.07 |
| Properties: | |
| Tensile rupture strength | 3180 psi |
| | (22,000 KPa) |
| Ultimate elongation | 1320 wt % |

By comparison of the above results it may be seen that improved narrowness in molecular weight distribution is obtained by use of a diamine or triamine in combination with the above described difunctional initiators. The improvement is attained without sacrifice of the desired low percentage of 3,4-diene addition products and with an increase in polymer properties such as tensile rupture strength.

EXAMPLE 14

As previously mentioned, a further embodiment of the present invention employs the use of both an amine and a lithium alkoxide. In illustration of this embodiment the reaction conditions of example 1 are substantially repeated excepting that a 100 ml glass bottle reactor is employed; the ratio AMINE/LIVING ENDS is 0.05; and lithium isopropoxide sufficient to attain a molar ratio of lithium isopropoxide/LIVING ENDS of 2.5:1 is added to the reactor containing cyclohexane and amine. Isoprene along with sufficient cyclohexane solvent to produce a final product solids content of 16% by weight is charged to the reactor. The reactor and contents are heated to 60° C. and the difunctional initiator is added. After complete polymerization of isoprene, styrene is added and polymerization allowed to continue. Upon completion of polymerization the reaction is terminated and the resulting SIS triblock polymer is recovered. Weight average molecular weight of the copolymer is 158,000 g/mole. Mw/Mn is 1.05. In the absence of a lithium alkoxide at the recited reaction temperatures a broader molecular weight distribution product results.

What is claimed:

1. A process for the polymerization of at least one anionically polymerizable monomer comprising contacting under anionic polymerization conditions the monomer with an initiator mixture comprising a multifunctional lithium containing compound corresponding to the formula:

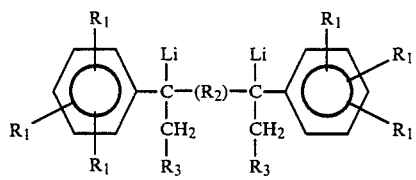

wherein:
$R_1$ is independently each occurrence hydrogen or an inert radical having from 0 to 16 carbon atoms;
$R_2$ is a divalent organic radical having at least 6 carbon atoms, $R_2$ having at least one aromatic ring and the aromatic ring being directly attached to a carbon which is attached to an aromatic ring of the above formula;
$R_3$ is selected from the group consisting of alkyl, cycloalkyl, aromatic, mixed alkyl/aromatic and mixed cycloalkyl/aromatic radicals containing from 1 to 20 carbon atoms;
and an organic diamine or triamine corresponding to the formula:

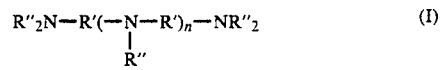

wherein:
$R'$ independently each occurrence is a $C_{2-20}$ alkadiyl group or an inertly substituted derivative thereof;
$R''$ independently each occurrence is a $C_{1-20}$ alkyl group or an inertly substituted derivative thereof; and
n is zero or one.

2. The process of claim 1 wherein the anionically-polymerizable monomer comprises an alkenyl aromatic monomer of the formula:

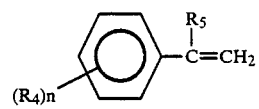

wherein:
n is an integer from 0 to 3;
$R_4$ is an alkyl radical containing up to 5 carbon atoms; and
$R_5$ is hydrogen or methyl.

3. The process of claim 2 wherein the alkenyl aromatic monomer comprises styrene or a mixture of styrene and α-methylstyrene.

4. The process of claim 1 wherein the anionically polymerizable monomer comprises a conjugated diene.

5. The process of claim 1 wherein both at least one alkenyl aromatic monomer and at least one conjugated diene are polymerized.

6. The process of claim 4 wherein the conjugated diene is butadiene.

7. The process of claim 4 wherein the conjugated diene is isoprene.

8. The process of claim 5 wherein isoprene and styrene or isoprene, styrene and α-methylstyrene are polymerized.

9. The process of claim 1 wherein the organic diamine or triamine is selected from the group consisting of N,N,N',N'-tetramethylethylenediamine, N,N,N',N'',N''-pentamethyldiethylenetriamine, N,N,N',N'',N''-pentamethyldi-1,3-propylenetriamine, and 4-ethyl-1,1,7,7-tetramethyldiethylenetriamine.

10. The process of claim 1 wherein the initiator mixture additionally comprises a metal alkoxide.

11. The process of claim 10 wherein the metal alkoxide is a lithium alkoxide.

12. The process of claim 11 wherein the metal alkoxide is a $C_{2-16}$ lithium alkoxide.

13. A polymerization initiator composition comprising a hydrocarbon solvent, a multifunctional lithium containing polymerization initiator corresponding to the formula:

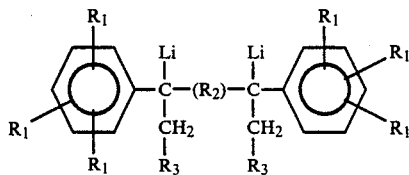

wherein:
R₁ is independently each occurrence hydrogen or an inert radical having from 0 to 16 carbon atoms;
R₂ is a divalent organic radical having at least 6 carbon atoms, R₂ having at least one aromatic ring and the aromatic ring being directly attached to a carbon which is attached to an aromatic ring of the above formula;
R₃ is selected from the group consisting of alkyl, cycloalkyl, aromatic, mixed alkyl/aromatic and mixed cycloalkyl/aromatic radicals containing from 1 to 20 carbon atoms;

and a diamine or triamine corresponding to the formula:

$$R''_2N-R'(-N-R')_n-NR''_2 \quad (I)$$
$$\phantom{R''_2N-R'(-N}|\phantom{R')_n-NR''_2}$$
$$\phantom{R''_2N-R'(-N}R''\phantom{R')_n-NR''_2}$$

R' independently each occurrence is a C₂₋₂₀ alkadiyl group or an inertly substituted derivative thereof;
R" independently each occurrence is a C₁₋₂₀ alkyl group or an inertly substituted derivative thereof; and
n is zero or one;
wherein the ratio of diamine or triamine to multifunctional lithium compound (based on moles of diamine or triamine per equivalent of multifunctional lithium compound) is from about 0.005:1 to 1:1.

14. A polymerization initiator composition according to claim 13 wherein the diamine or triamine is selected from the group consisting of N,N,N',N'-tetramethylethylenediam N,N,N',N"N"-pentamethyldiethylenetriamine, N,N,N',N",N"'-pentamethyldi-1,3-propylenetriamine, 4-ethyl-1,1,7,7-tetramethl-diethylenetriamine.

15. A polymerization initiator composition according to claim 11 wherein the molar ratio of diamine or triamine to multifunctional lithium compound is from about 0.02:1 to 0.5:1.

16. A polymerization initiator composition according to claim 11 additionally comprising a metal alkoxide.

17. A polymerization initiator composition according to claim 16 wherein the metal alkoxide is a C₂₋₁₂ lithium alkoxide.

* * * * *